(12) United States Patent
Chen et al.

(10) Patent No.: US 10,329,199 B2
(45) Date of Patent: Jun. 25, 2019

(54) METHOD FOR SYNTHESIZING CERAMIC COMPOSITE POWDER AND CERAMIC COMPOSITE POWDER

(71) Applicant: XiangTan QUFO Technology Material CO., Ltd, Xiangtan, Hunan (CN)

(72) Inventors: Daming Chen, Hunan (CN); Xiaoping Ouyang, Hunan (CN); Yongli Zhang, Hunan (CN)

(73) Assignee: XIANGTAN QUFO TECHNOLOGY MATERIAL CO., LTD, Xiangtan, Hunan (CN)

( * ) Notice: Subject to any disclaimer, the term of this patent is extended or adjusted under 35 U.S.C. 154(b) by 0 days.

(21) Appl. No.: 15/649,943

(22) Filed: Jul. 14, 2017

(65) Prior Publication Data

US 2018/0118626 A1     May 3, 2018

(30) Foreign Application Priority Data

Oct. 28, 2016   (CN) .......................... 2016 1 0969983

(51) Int. Cl.
   *C04B 35/26*     (2006.01)
   *C04B 35/01*     (2006.01)
   (Continued)

(52) U.S. Cl.
   CPC ........ *C04B 35/2658* (2013.01); *C04B 35/016* (2013.01); *C04B 35/26* (2013.01); *C04B 35/2608* (2013.01); *C04B 35/453* (2013.01); *C04B 35/4684* (2013.01); *C04B 35/491* (2013.01); *C04B 35/622* (2013.01); *C04B 35/63428* (2013.01); *C04B 35/63444* (2013.01); *C04B 2235/3203* (2013.01); (Continued)

(58) Field of Classification Search
   CPC .......................... C04B 35/624; C04B 38/0045
   See application file for complete search history.

(56) References Cited

U.S. PATENT DOCUMENTS

| | | | |
|---|---|---|---|
| 9,266,781 B2 * | 2/2016 | Wang | B32B 18/00 |
| 2010/0046141 A1 * | 2/2010 | Thomas | H01G 9/0032 361/323 |
| 2016/0293988 A1 * | 10/2016 | Sakamoto | H01M 8/1253 |

* cited by examiner

*Primary Examiner* — Noah S Wiese
(74) *Attorney, Agent, or Firm* — Yue (Robert) Xu; Apex Attorneys at Law, LLP

(57) ABSTRACT

The embodiments of the present invention disclose a method for synthesizing ceramic composite powder and ceramic composite powder, pertaining to the technical field of inorganic non-metallic materials. Among them, the method includes preparing an aqueous slurry of ceramic raw materials, the aqueous slurry including ceramic raw material, water and low polymerization degree organometallic copolymer, the ceramic raw material including at least two components; adding a crosslinking coagulant into the aqueous slurry to obtain a gel; dehydrating and drying the gel to obtain the dried gel; heating the dried gel to the synthesizing temperature of the ceramic composite powder and conducting the heat preservation to obtain ceramic composite powder or ceramic composite base powder; conducting secondary doping on ceramic composite base powder to obtain the ceramic composite powder. The multi-component ceramic composite powder prepared by the embodiments of the present invention has uniformly dispersed each component and low synthesizing temperature.

8 Claims, 9 Drawing Sheets

(51) Int. Cl.
  *C04B 35/453* (2006.01)
  *C04B 35/634* (2006.01)
  *C04B 35/468* (2006.01)
  *C04B 35/491* (2006.01)
  *C04B 35/622* (2006.01)

(52) U.S. Cl.
  CPC .............. *C04B 2235/3208* (2013.01); *C04B 2235/3217* (2013.01); *C04B 2235/3225* (2013.01); *C04B 2235/3227* (2013.01); *C04B 2235/3251* (2013.01); *C04B 2235/3262* (2013.01); *C04B 2235/3274* (2013.01); *C04B 2235/3279* (2013.01); *C04B 2235/3284* (2013.01); *C04B 2235/3294* (2013.01); *C04B 2235/3418* (2013.01); *C04B 2235/6023* (2013.01); *C04B 2235/763* (2013.01)

METHOD FOR SYNTHESIZING CERAMIC COMPOSITE POWDER AND CERAMIC COMPOSITE POWDER

FILED OF THE INVENTION

The embodiments of the present invention relate to the technical field of inorganic non-metallic materials, and in particular, to a method for synthesizing ceramic composite powder and ceramic composite powder.

BACKGROUND OF THE INVENTION

At present, ceramic powders used in most functional ceramic and functional coatings are multi-component composite powders synthesized by a solid-phase reaction method which is the most widely adopted in industrial productions. Different from gas reaction and liquid reaction, the solid-phase reaction includes two processes of chemical reaction and substance migration to a reaction zone, belonging to a heterogeneous phase reaction. Atoms and ions in a raw material can react by close contact and slow diffusion. Therefore, solid-phase particles participating in the reaction to contact to one another is a prerequisite of chemical action and substance transfer among reactants. The reaction mechanism of synthesizing multi-component powder by a solid-phase method starts at contact portions of particle surfaces of each raw material to generate new-phase products, and then the structural adjustment and crystal growth of product layers take place. When the product layers have a certain thickness, the diffusion of each raw material continues by the product layers, until the all forms a new-phase structure. In practical production, generally, powder raw materials of required components are ball-milled and mixed by a wet process and dried, and then are calcined to conduct the solid-phase reaction, to synthesize multi-component ceramic composite powder with a certain crystal structure.

Compared with the liquid-phase method or the gas-phase method, the solid-phase method has the advantages of no special requirements to process conditions, simple and convenient operation, wide availability of raw materials, low production cost, high efficiency and little pollution to environment. Especially in case of determining raw material components, the solid-phase method may relatively accurately control its component constitution, and thus has high universality and is suitable for industrial productions. Recently, the solid-phase method is still widely applied to the industrial production of general multi-component ceramic powder, and also often to laboratory studies.

However, this method has obvious disadvantages. During the process that slurry uniformly mixed-grinding by the wet process is dehydrated and dried, each component powder raw material tends to have the phenomenon of component sedimentation and non-uniform aggregation state due to different specific gravities and suspension properties. Generally, non-uniform components caused during this process is avoided by filter pressing, atomizing or freeze-drying, which certainly increases equipment investments and process costs; when synthesized powder is calcined, in case of natural stacking, there is poor contact among the multi-component powder, relatively distant diffusion distance between mass points, slow reaction speed, low efficiency and loss of volatile components. In order to facilitate the reaction, it is possible to refine granularity of raw powder as much as possible (for example, 1 μm or less), appropriately enlarge the contact surface of the reactants, and increase the mixing uniformity of the reactants or raise the calcination temperature. However, raising the calcination temperature not only increases the cost, but also causes hard aggregation in powder, relatively great powder granularity, and relatively wide particle size distribution; if calcination is conducted after briquetting, a local sintering cake is difficult to be broken due to non-uniform density of each position of a press cake although the reaction efficiency is increased. In summary, the traditional solid-phase reaction synthesizing method, when used to produce composite powder, has the disadvantages of low possibility of uniformly mixing each component, high synthesizing temperature, and great powder particle size. Besides, it is often impossible to get the required phase composition, and thus influence the quality of the synthesized powder.

Recently, the development of the technique of synthesizing ceramic powder by the liquid-phase method provides a better choice for preparing multi-component composite ultrafine powder. Since uniform mixing of each component at a level of molecule and atom can be realized in the liquid-phase, the synthesized powder has relatively good performance, thereby becoming a new technique widely applied in a laboratory room and in production. In the technique of synthesizing the multi-component composite ceramic powder by the liquid-phase method, a coprecipitation method and a sol-gel method are widely used. The coprecipitation method must adopt water-soluble raw materials, and it is easy to prepare the multi-component system powder. Recently, many practical applications have been found, but its coagulation and multiple filtering and cleaning are time-consuming and complicated. Moreover, for the multi-component composite system, due to different conditions of different metal ions in a solution generating sediments, it is scarcely possible to let plural ions of the constituent materials to subside at the same time. Meanwhile, a solubility product is different in sediments, and loss of partial components may occur in the water-washing process, which causes inaccurate components, and influences the performance of synthesized powder; the sol-gel method uses good diffusion of colloid ions, and may obtain nano ultrafine powder by adopting the appropriate dehydration and drying process. However, such process usually takes expensive metal alkoxide as a raw material, with high cost and long period. The gel process of sol is difficult to control. If the dehydration method is not appropriate, polycondensation and caking occur, which causes hard aggregation of particles, and thus the industrial production is limited.

For the problems existing in the traditional solid-phase reaction method and the prior liquid-phase method to synthesize the composite ceramic powder, a new powder synthesizing process is proposed. This method is a new powder preparing process generated by combining the traditional solid-phase reaction powder preparing process and the ceramic casting technique. The basic process of this technique is to mix the raw materials containing each component according to a certain ratio to prepare a aqueous slurry, add organic monomer acrylamide and a crosslinker of methylene bisacrylamide therein, make the organic monomer and the crosslinker conduct polymerization reaction under certain conditions to form a water-based polymer gel whose three-dimensional network skeleton fixes each raw material therein. The gel is burnt to remove the organic substance subjected to dehydration and drying at a certain temperature, and then to synthesize and obtain the required ceramic powder after calcination. In this process, the raw material slurry conducts rapid gelation reaction by controlling exterior conditions after uniformly mixed, and its drying process is conducted subjected to the gelation reaction after each raw material particle is fixed and cannot move relatively. Therefore, compared with the conventional solid-phase method, it can avoid the problem of non-uniform component caused by sedimentation significantly. Meanwhile, the raw material powder in the gel can keep a closely stacked state after dried. Close contact contributes to the solid-phase reaction in calcination, so the calcination synthesizing temperature is obviously lower than that of the conventional solid-phase method.

However, the above method needs to use acrylamide as a gel material, which is toxic and is harmful to human. In addition, together with a dispersing agent, pH value modifier, initiator and catalyst added when preparing the slurry, the total amount of the added organic matter will achieve more than 3% of the raw material powder weight. During the process of calcining the gel after dried, it needs to slowly raise its temperature or conduct temperature preservation at the temperature of 200° C. to 600° C., to thoroughly burn off the residual carbon of the organic matter, which prolongs the calcining time and does not contribute to the energy conservation.

SUMMARY OF THE INVENTION

The object of the embodiments of the present invention is to provide a method for synthesizing multi-component ceramic composite powder with uniform diffusion of each component and low synthesizing temperature, and the ceramic composite powder synthesized by using this method.

According to one aspect of the embodiments of the present invention, there is provided a method for synthesizing ceramic composite powder, including: preparing an aqueous slurry of ceramic raw materials, the aqueous slurry including ceramic raw material, water and low polymerization degree organometallic copolymer, the ceramic raw material including at least two components; adding a crosslinking coagulant into the aqueous slurry to obtain a gel; dehydrating and drying the gel to obtain the dried gel; heating the dried gel to the synthesizing temperature of the ceramic composite powder and conducting heat preservation to obtain ceramic composite powder or ceramic composite base powder; conducting secondary doping on ceramic composite base powder to obtain the ceramic composite powder.

Further, the ceramic raw material includes carbonate, oxalate, acetate, hydroxide, oxide and/or minor additive elements, the minor additive elements including water-soluble saline material.

Further, a weight ratio of the ceramic raw material, water and low polymerization degree organometallic copolymer is 100:20~100:0.3~0.8.

Further, the crosslinking coagulant is a polyethyleneimine water solution with a concentration of 5%~20%, and the added amount of the crosslinking coagulant is 2%~10% of the weight of the low polymerization degree organometallic copolymer.

Further, the step of conducting the secondary doping on the ceramic composite base powder to obtain the ceramic composite powder includes: coarse crushing the ceramic composite base powder; adding the secondary doping raw material in the ceramic composite base powder subjected to coarse crushing, to obtain the doped powder, the secondary doping raw material including: $Sb_2O_3$, $MnCO_3$, $SiO_2$, $Al_2O_3$ and $Li_2CO_3$ powder; preparing an aqueous slurry of the doped powder, including: doped powder, water and low polymerization degree organometallic copolymer; adding the crosslinking coagulant in the aqueous slurry of the doped powder, to obtain the doped gel; dehydrating and drying the doped gel to obtain the dried doped gel; crushing the dried doped gel to obtain the ceramic composite powder.

Further, the low polymerization degree organometallic copolymer is the one with a molecular weight of $10^4$~$10^5$, preferably, isobutene-maleic anhydride organometallic copolymer amide-ammonium salt with the molecular weight of $10^4$~$10^5$.

Further, the step of adding the crosslinking coagulant in the aqueous slurry includes: stirring the aqueous slurry to be substantially uniform while adding the crosslinking coagulant; standing the mixture for 3 min to 10 min to obtain the gel.

Further, the step of preparing the aqueous slurry of the ceramic raw material includes: mixed-grinding the ceramic raw material, water and low polymerization degree organometallic copolymer for 1 hour to 30 hours, to obtain the aqueous slurry of the ceramic raw material.

Further, the dehydration and drying process conducted on the gel includes natural dehydration and drying, heating dehydration and drying, infrared heating or microwave heating and drying; the heating the dried gel includes calcining and heating.

According to another aspect of the embodiments of the present invention, there is provided ceramic composite powder or doped ceramic composite powder synthesized by any one of the above synthesizing methods.

In the multi-component ceramic composite powder and its synthesizing method provided by the embodiments of the present invention, the low polymerization degree organometallic copolymer is adopted, especially isobutylene-maleic anhydride copolymer organic amide-ammonium salt as the dispersing agent, which can prepare the aqueous slurry of the multi-component ceramic raw material with high solid-phase content, good mobility, and stable suspension. The isobutylene-maleic anhydride copolymer organic amide-ammonium salt enables each component in the multi-component ceramic raw material to diffuse uniformly, and have the rapid gelation function at the same time. The weight of the dispersing agent is less than 1% of the multi-component ceramic raw material. The amount of the dispersing agent is small, so during heating, it can be completely burnt off, which can achieve the effect of being intoxic and unharmful, solye the problems of non-uniform diffusion of each component, and high calcining and synthesizing temperature when the traditional solid-phase reaction method is used to synthesize the ceramic composite powder. The common liquid-phase method has the problems that the multiple washing and filtering is complicated, the components tend to be lost, the accuracy is low, and the costs are high; the prior gel solid-phase reaction method has the disadvantages that the acrylamide is toxic and the total amount of organic matter is large.

DETAILED DESCRIPTION OF THE EMBODIMENTS

Figure 1:
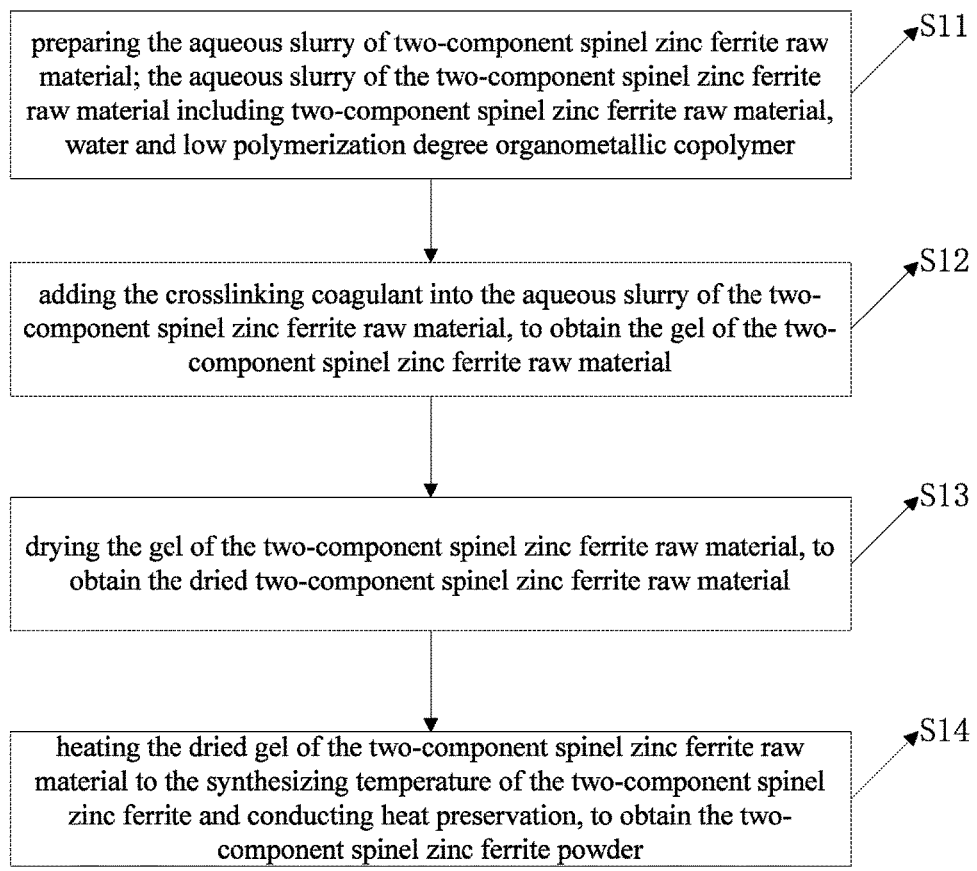
FIG. 1 is a flowchart of the method for synthesizing two-component spinel zinc ferrite powder according to the first embodiment of the present invention.

In order to make the objectives, technical solution and advantages of the present invention clearer, the present invention is further explained in detail with combination of the embodiments and with reference to the drawings. It shall be understood that the descriptions are only illustrative, but not to limit the scope of the present invention. In addition, in the following explanation, the description of the well-known structure and technology is omitted to avoid unnecessarily confusing the concepts of the present invention.

In the method for synthesizing ceramic composite powder according to the embodiment of the present invention, firstly, an aqueous slurry of ceramic raw materials is prepared, in which the aqueous slurry includes ceramic raw material, water and low polymerization degree organometallic copolymer, the weight ratio of the ceramic raw material, water and low polymerization degree organometallic copolymer is 100:20~100:0.3~0.8, the ceramic raw material is a raw material with at least two components; the ceramic raw material includes carbonate, oxalate, acetate, hydroxide, oxide and/or minor additive elements, the minor additive elements can adopt water-soluble saline material.

Then, the crosslinking coagulant with a concentration of 5%-20% is added into the aqueous slurry to obtain a gel, the added amount of the crosslinking coagulant is 2%~10% of the weight of the low polymerization degree organometallic copolymer, the crosslinking coagulant is a polyethyleneimine water solution with the concentration of 5%~20%; the gel is dehydrated and dried to obtain the dried gel. In one optional embodiment, the dehydration and drying process may be natural dehydration and drying or heating dehydration and drying by ventilating the gel, or may be infrared heating or microwave heating by chipping the gel; finally, the dried gel is heated to the synthesizing temperature of the ceramic composite powder and the heat preservation is conducted, heating the dried gel includes calcining to obtain ceramic composite powder, and the synthesizing temperature and the time of heat preservation conducting secondary doping on ceramic composite base powder to obtain the ceramic composite powder vary with the raw material of the ceramic composite powder.

Preferably, the low polymerization degree organometallic copolymer is the one with a molecular weight of $10^4$~$10^5$, more preferably, the isobutene-maleic anhydride organometallic copolymer amide-ammonium salt with the molecular weight of $10^4$~$10^5$. The isobutene-maleic anhydride organometallic copolymer is an amphoteric polymer, in the structure, the isobutylene segment has strong lipophilicity, the maleic anhydride segment has good hydrophilia, so can be taken as a dispersing agent of water-soluble slurry after ammonium salt reaction. The crosslinker can be taken as a super absorbent resin, and as a drilling fluid, viscosity reducer of cement paste, and water treating agent. Its nature is strongly correlated to the copolymerization ratio of isobutene and maleic anhydride, and the distribution and molecule amount of the two monomers in a macromolecular chain, and the like. ISOBAM™-104 is a specification of low polymerization degree (the molecular weight is $10^4$~$10^5$) isobutene-maleic anhydride organometallic copolymer amide-ammonium salt. It is prepared by ammoniating ISOBAM with a standard specification, and has the characteristic of the standard specification and can be water soluable. Therefore, the addition of an appropriate amount of low molecule amount ISOBAM™-104 into the aqueous ceramic powder slurry contributes to preparing the aqueous slurry with high solid-phase content, good mobility and stable suspension. The isobutene-maleic anhydride organometallic copolymer amide-ammonium salt is nontoxic and harmless, is taken as the aqueous slurry dispersing agent and gel, is used in a small amount, and can be completely burnt off during calcination.

In the method for synthesizing ceramic composite powder, the raw material to be used is substantially the same as the general solid-phase reaction method, but under the condition of not increasing or less increasing the raw material cost, the carbonate, oxalate, acetate, and hydroxide of the required component are selected as much as possible to replace the raw material of metallic oxide. On the one hand, the calcining synthesizing temperature can be reduced by using the high reactivity of its decomposition product, and on the other hand, only the gases such as $H_2O$ and $CO_2$ are generated in case of decomposition without generating any corrosive or toxic and harmful gas such as HCl, $Cl_2$, $NO_N$, and $SO_x$. When the microelements are to be added, the water-soluble saline materials are selected, which enables the raw materials to be mixed more uniform, and the ceramic raw material can be refined by ball-milling and the mixing with water and organometallic copolymer is more uniform. The water amount to be added is 20% to 100% of the weight of ceramic raw material. A ball material ratio (a mass ratio of a grinding body to a material quantity in each cabin of the mill) is between 1:1~5:1, and the ball-milling time lasts 1 hour to 30 hours.

Specifically, the explanation is made by the following embodiments.

First Embodiment

FIG. 1 shows a flowchart of the method for synthesizing two-component spinel zinc ferrite powder according to the first embodiment of the present invention.

As shown in FIG. 1, the synthesizing method includes:

S11, preparing the aqueous slurry of two-component spinel zinc ferrite raw material; the aqueous slurry of the two-component spinel zinc ferrite raw material including two-component spinel zinc ferrite raw material, water and low polymerization degree organometallic copolymer, the low polymerization degree organometallic copolymer is the one with a molecule weight of $10^4$ to $10^5$, preferably isobutene-maleic anhydride organometallic copolymer amide-ammonium salt with a molecule weight of $10^4$ to $10^5$.

The two-component spinel zinc ferrite raw material includes zinc oxalate ($ZnC_2O_4 \cdot 2H_2O$) and ferrous oxalate ($FeC_2O_4$), which are mixed according to the molar ratio of Zn:Fe=1:2, and then deionized water with a weight being 20%~100% of the weight of the two-component spinel zinc ferrite raw material and the isobutene-maleic anhydride organometallic copolymer amide-ammonium salt with a weight being 0.3%~0.8% thereof are added, and ball-mixed in a ball mill (the ball material ratio is 1~5:1) for 1 hour to 30 hours to prepare the aqueous slurry of the two-component spinel zinc ferrite raw material. Preferably, the weight of the deionized water is 20%, 25%, 28%, 31%, 35%, 40%, 45%, 50%, 55%, 60%, 65%, 70%, 75%, 80%, 85%, 90%, 95% or 100% of the weight of the two-component spinel zinc ferrite raw material, most preferably, 30%; preferably, the weight of the isobutene-maleic anhydride organometallic copolymer amide-ammonium salt is 0.3%, 0.4%, 0.5%, 0.6%, 0.7% or 0.8% of the weight of the two-component spinel zinc ferrite raw material, most preferably, 0.6%, and the ball-milling time is preferably 4 hours. The mass ratio of the grinding body and the added two-component spinel zinc ferrite raw material, water and low polymerization degree organometallic copolymer in the ball mill is preferably 3:1.

S12, adding the crosslinking coagulant into the aqueous slurry of the two-component spinel zinc ferrite raw material, to obtain the gel of the two-component spinel zinc ferrite raw material.

Specifically, the aqueous slurry subjected to grinding in the ball mill is placed in a container, the polyethyleneimine water solution with a concentration of 5% to 20% is added while stirring the aqueous slurry of the two-component spinel zinc ferrite raw material, the weight of the added polyethyleneimine water solution is 2% to 10% of the weight of the isobutene-maleic anhydride organometallic copolymer amide-ammonium salt (ISOBAM™-104), and then the mixture still stands for about 3 min to 10 min after stirring evenly, such that the aqueous slurry of the two-component spinel zinc ferrite raw material added with the crosslinking coagulant is gelated to form the gel of the two-component spinel zinc ferrite raw material. The concentration of the polyethyleneimine water solution is preferably 5%, 6%, 7%, 8%, 9%, 10%, 11%, 12%, 13%, 14%, 15%, 16%, 17%, 18%, 19% or 20%, most preferably, 10%. The added amount of the polyethyleneimine water solution is preferably 2%, 3%, 4%, 5%, 6%, 7%, 8%, 9% or 10%, most preferably, 5%. The still-standing time is preferably 5 min.

S13, drying the gel of the two-component spinel zinc ferrite raw material, to obtain the dried two-component spinel zinc ferrite raw material.

The gel of the two-component spinel zinc ferrite raw material is sliced into flakes with a thickness of about 10 mm, and is naturally dehydrated and dried to a constant weight.

S14, heating the dried gel of the two-component spinel zinc ferrite raw material to the synthesizing temperature of the two-component spinel zinc ferrite and conducting kgheat preservation, to obtain the two-component spinel zinc ferrite powder.

Figure 6:
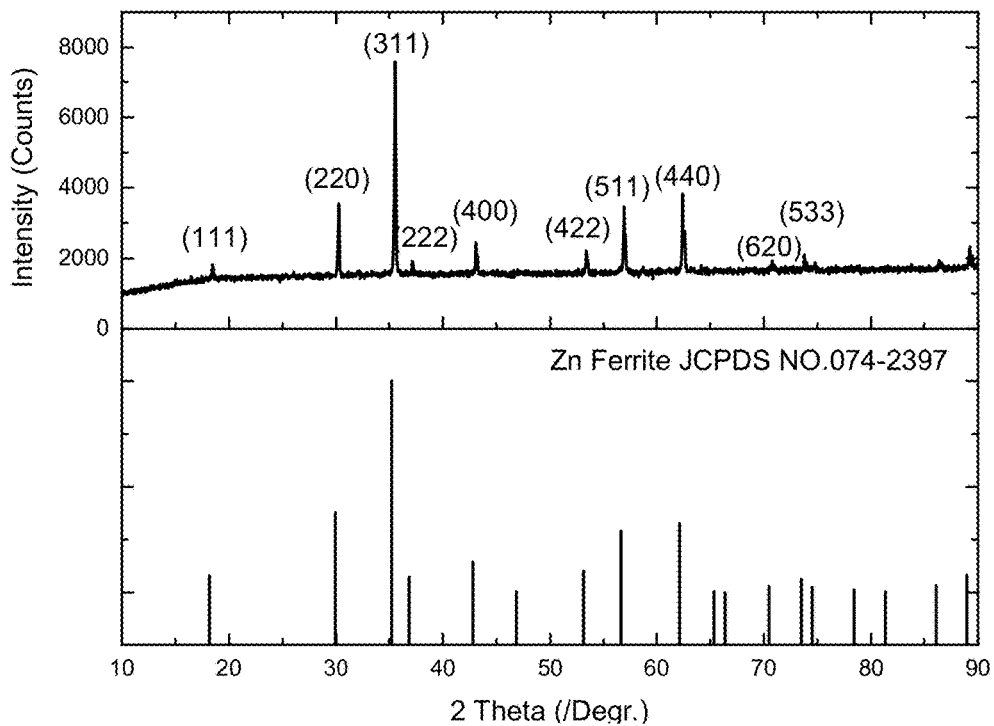
FIG. 6 is an XRD spectrogram of the two-component spinel zinc ferrite powder synthesized by the synthesizing method according to the first embodiment of the present invention.

Specifically, the dried gel of the two-component spinel zinc ferrite raw material is placed in a crucible, and the temperature is directly raised to 800° C. in a muffle furnace and kept for 3 hours, that is to obtain $ZnFe_2O_4$ powder with a single spinel phase structure. The XRD spectrum of the prepared $ZnFe_2O_4$ powder is shown in FIG. 6. The synthesizing method adopted in the first embodiment of the present invention is much lower in the synthesizing temperature than the traditional solid-phase reaction method, and is nearly equivalent to the chemical coprecipitation method in the synthesizing temperature.

Second Embodiment

Figure 2:
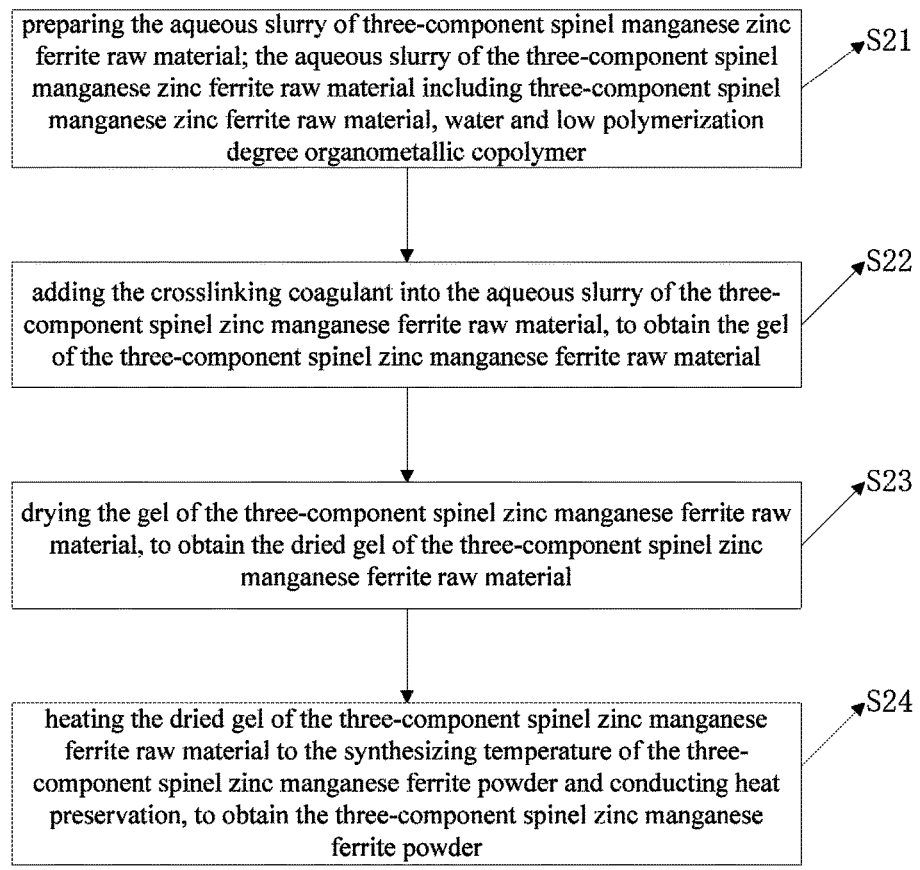
FIG. 2 is a flowchart of the method for synthesizing three-component spinel manganese zinc ferrite powder according to the second embodiment of the present invention.

FIG. 2 shows a flowchart of the method for synthesizing three-component spinel manganese zinc ferrite powder according to the second embodiment of the present invention.

As shown in FIG. 2, the synthesizing method includes:

S21, preparing the aqueous slurry of three-component spinel manganese zinc ferrite raw material; the aqueous slurry of the three-component spinel manganese zinc ferrite raw material including three-component spinel manganese zinc ferrite raw material, water and low polymerization degree organometallic copolymer, the low polymerization degree organometallic copolymer is the one with a molecule weight of $10^4$ to $10^5$, preferably isobutene-maleic anhydride organometallic copolymer amide-ammonium salt with a molecule weight of $10^4$ to $10^5$.

The three-component spinel manganese zinc ferrite raw material includes water-soluble zinc cetate, non-water soluble manganese carbonate and ferrous oxalate, the ratio of manganese, zinc and iron in the three-component spinel manganese zinc ferrite is 0.6:0.4:2 (molar ratio), and then deionized water with a weight being 20%~100% of the weight of the three-component spinel zinc manganese ferrite raw material and the isobutene-maleic anhydride organometallic copolymer amide-ammonium salt with a weight being 0.3%~0.8% thereof are added. Preferably, the weight of the deionized water is 20%, 25%, 28%, 31%, 35%, 40%, 45%, 50%, 55%, 60%, 65%, 70%, 75%, 80%, 85%, 90%, 95% or 100% of the weight of the three-component spinel zinc manganese ferrite raw material, most preferably, 50%; preferably, the weight of the isobutene-maleic anhydride organometallic copolymer amide-ammonium salt is 0.3%, 0.4%, 0.5%, 0.6%, 0.7% or 0.8% of the weight of the three-component spinel zinc manganese ferrite raw material, most preferably, 0.3%. In a ball mill, the ball material ratio (the mass ratio of the grinding body and the three-component spinel manganese zinc ferrite raw material, water and low polymerization degree organometallic copolymer) is 1~5:1, and the mixture is ball-milled for 20 hours to prepare the aqueous slurry of the three-component spinel zinc manganese ferrite raw material. Preferably, the ball material ratio is 1:1.

S22, adding the crosslinking coagulant into the aqueous slurry of the three-component spinel zinc manganese ferrite raw material, to obtain the gel of the three-component spinel zinc manganese ferrite raw material; the crosslinking coagulant is preferably a polyethyleneimine water solution with a concentration of 5%-20%.

Specifically, after the aqueous slurry prepared in the step S21 is discharged from the ball mill, the polyethyleneimine water solution with a concentration of 5° 6 to 20% is added while stirring the aqueous slurry prepared in the step S21, the weight of the polyethyleneimine water solution is 2% to 10% of the weight of the isobutene-maleic anhydride organometallic copolymer amide-ammonium salt, and then the mixture still stands for about 3 min to 10 min after stirring evenly, such that the aqueous slurry of the three-component spinel zinc manganese ferrite raw material added with the crosslinking coagulant is gelated to obtain the gel of the three-component spinel zinc manganese ferrite raw material. The concentration of the polyethyleneimine water solution is preferably 5%, 6%, 7%, 8%, 9%, 10%, 11%, 12%, 13%, 14%, 15%, 16%, 17%, 18%, 19% or 20%, most preferably, 20%. The added amount of the polyethyleneimine water solution is preferably 2%, 3%, 4%, 5%, 6%, 7%, 8%, 9% or 10%, most preferably, 3%. The still-standing time is preferably 8 min.

S23, drying the gel of the three-component spinel zinc manganese ferrite raw material, to obtain the dried gel of the three-component spinel zinc manganese ferrite raw material.

Specifically, the gel of the three-component spinel zinc manganese ferrite raw material is sliced into flakes with a thickness of about 5 mm, and is dehydrated and dried naturally or in a microwave oven to a constant weight.

S24, heating the dried gel of the three-component spinel zinc manganese ferrite raw material to the synthesizing temperature of the three-component spinel zinc manganese ferrite powder and conducting heat preservation, to obtain the three-component spinel zinc manganese ferrite powder.

Figure 7:
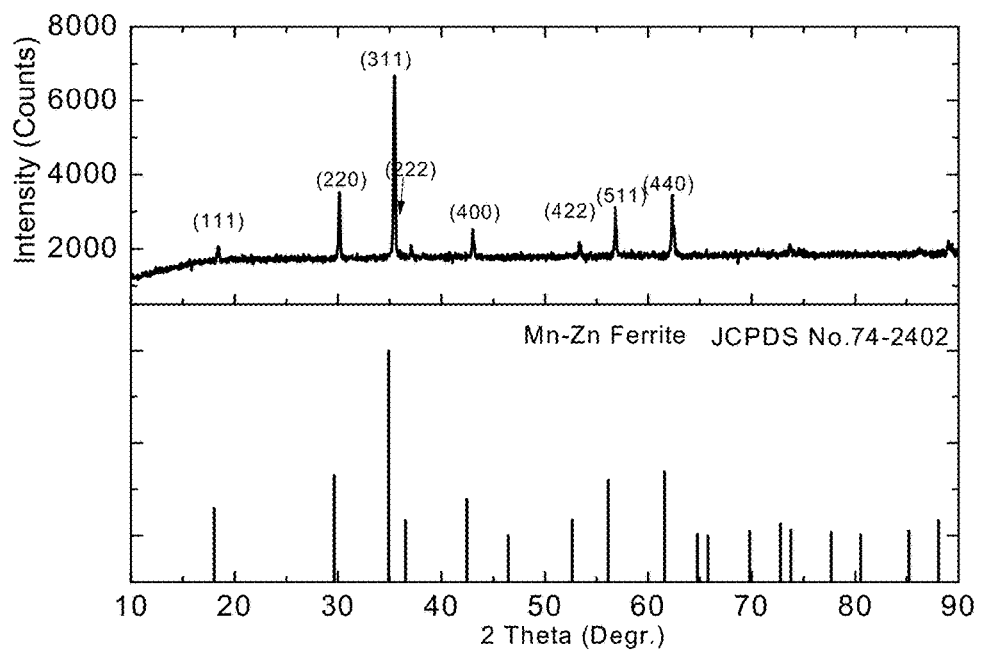
FIG. 7 is an XRD spectrogram of the three-component spinel zinc manganese ferrite powder synthesized at a temperature of 1050° C. according to the second embodiment of the present invention.

Specifically, the dried gel of the three-component spinel zinc manganese ferrite raw material is placed in a crucible, and when the temperature is raised to 1050° C. in a muffle furnace, the heat preservation is conducted for 3 hours, that is to obtain $Mn_{0.6}Zn_{0.4}Fe_2O_4$ ferrite powder with a single spinel phase structure. The XRD spectrum of the synthesized three-component spinel zinc manganese ferrite powder is shown in FIG. 7.

Third Embodiment

Figure 3:
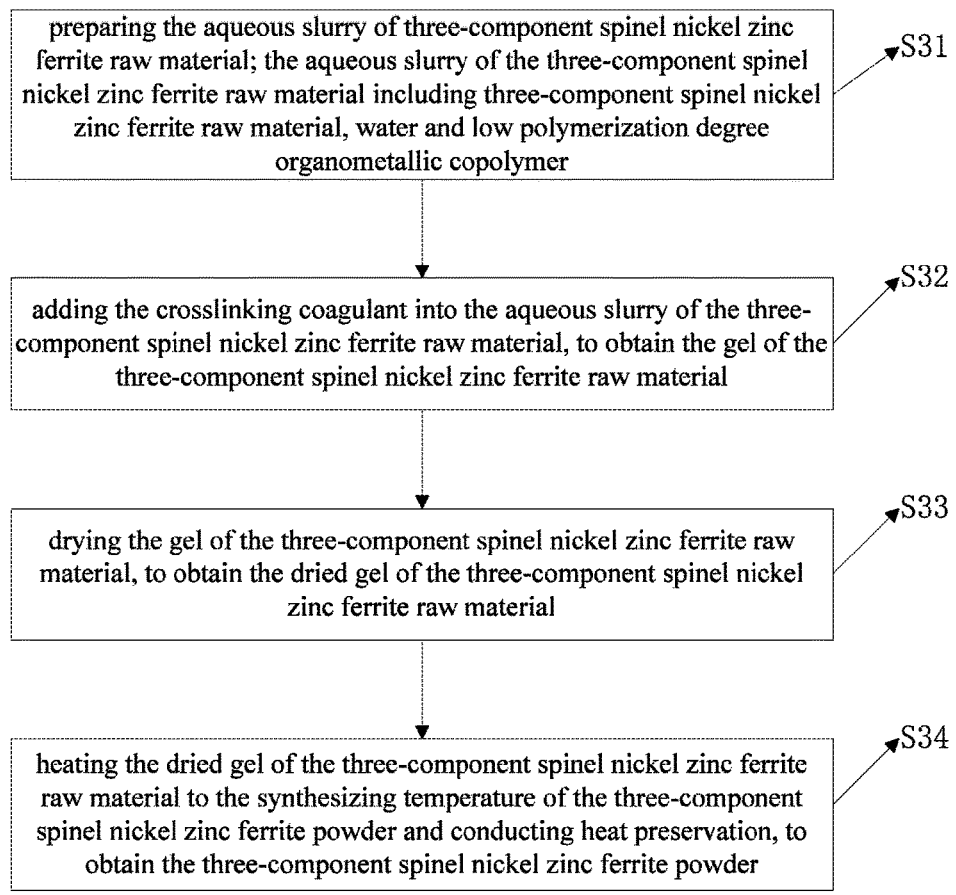
FIG. 3 is a flowchart of the method for synthesizing three-component spinel nickel zinc ferrite powder according to the third embodiment of the present invention.

FIG. 3 shows a flowchart of the method for synthesizing three-component spinel nickel zinc ferrite powder according to the third embodiment of the present invention.

As shown in FIG. 3, the synthesizing method includes:

S31, preparing the aqueous slurry of three-component spinel nickel zinc ferrite raw material; the aqueous slurry of the three-component spinel nickel zinc ferrite raw material including three-component spinel nickel zinc ferrite raw material, water and low polymerization degree organometallic copolymer, the low polymerization degree organometallic copolymer is the one with a molecule weight of $10^4$ to $10^5$, preferably the isobutene-maleic anhydride organometallic copolymer amide-ammonium salt with a molecule weight of $10^4$ to $10^5$.

The three-component spinel nickel zinc ferrite raw material includes basic nickel carbonate ($NiCO_3 \cdot 2Ni(OH)_2 \cdot 4H_2O$), nano-zinc oxide (ZnO) and ferrous oxalate ($FeC_2O_4$), the ratio of nickel, zinc and iron in the three-component spinel nickel zinc ferrite is 0.35:0.65:2 (molar ratio), and then isobutene-maleic anhydride organometallic copolymer amide-ammonium salt with a weight being 0.3%~0.8% of the weight of the three-component spinel nickel zinc ferrite raw material is added, and is ball-mixed in a ball mill (the ball material ratio is 1~5:1) for 1 hour to 30 hours to prepare the slurry of the three-component spinel nickel zinc ferrite raw material. Preferably, the weight of the isobutene-maleic anhydride organometallic copolymer amide-ammonium salt is 0.3%, 0.4%, 0.5%, 0.6%, 0.7% or 0.8% of the weight of the three-component spinel nickel zinc ferrite raw material, most preferably, 0.8%. The ball-milling time is preferably 8 hours. Preferably, the ball material ratio (the mass ratio of the grinding body and the three-component spinel nickel zinc ferrite raw material, water and low polymerization degree organometallic copolymer) is 5:1.

S32, adding the crosslinking coagulant into the aqueous slurry of the three-component spinel nickel zinc ferrite raw material, to obtain the gel of the three-component spinel nickel zinc ferrite raw material.

Specifically, after the aqueous slurry prepared in the step S31 is discharged from the ball mill, the polyethyleneimine water solution with a concentration of 5% to 20% is added while stirring the aqueous slurry prepared in the step S31, the weight of the polyethyleneimine water solution is 2% to 10% of the weight of the isobutene-maleic anhydride organometallic copolymer amide-ammonium salt, and then the mixture still stands for about 3 min to 10 min after stirring evenly, such that the aqueous slurry of the three-component spinel nickel zinc ferrite raw material added with the crosslinking coagulant is gelated to obtain the gel of the three-component spinel nickel zinc ferrite raw material. The concentration of the polyethyleneimine water solution is preferably 5%, 6%, 7%, 8%, 90%, 10%, 11%, 12%, 13%, 14%, 15%, 16%, 17%, 18%, 19% or 20%, most preferably, 10%. The added amount of the polyethyleneimine water solution is preferably 2%, 3%, 4%, 5%, 6%, 7%, 8%, 9% or 10%, most preferably, 8%. The still-standing time is preferably 6 min.

S33, drying the gel of the three-component spinel nickel zinc ferrite raw material, to obtain the dried gel of the three-component spinel nickel zinc ferrite raw material.

Specifically, the gel of the three-component spinel nickel zinc ferrite raw material is sliced into flakes with a thickness of about 5 mm, and is dehydrated and dried in a drier or naturally or in a microwave oven to a constant weight at a temperature of 100° C.

S34, heating the dried gel of the three-component spinel nickel zinc ferrite raw material to the synthesizing temperature of the three-component spinel nickel zinc ferrite powder and conducting heat preservation, to obtain the three-component spinel nickel zinc ferrite powder.

Figure 11:
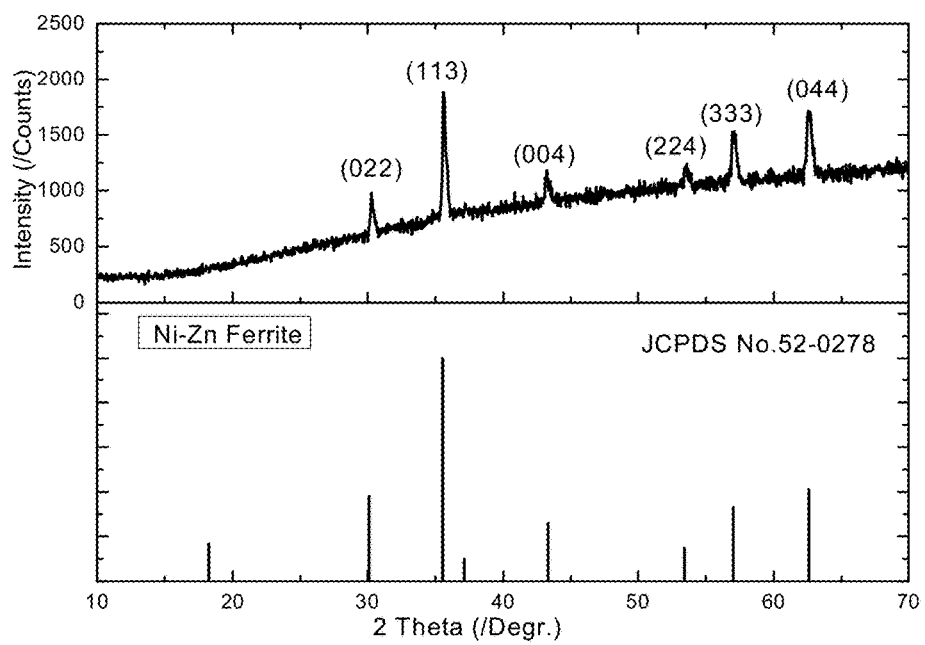
FIG. 11 is an XRD spectrogram of the three-component spinel nickel zinc ferrite powder synthesized by the embodiment of the present invention.

Specifically, the dried gel of the three-component spinel nickel zinc ferrite raw material is placed in a crucible, is heated in the muffle furnace to the temperature of 1000° C., and then the heat preservation is conducted for 3 hours, that is to obtain $Ni_{0.35}Zn_{0.65}Fe_2O_4$ ferrite powder with a single spinel phase structure. In terms of the synthesizing temperature, the three-component composite powder synthesized by the synthesizing method according to the embodiment of the present invention is lower than the traditional solid-phase reaction method by about 50° C.~100° C. The XRD spectrum of the synthesized $Ni_{0.35}Zn_{0.65}Fe_2O_4$ ferrite powder is shown in FIG. 11.

Fourth Embodiment

Figure 4:
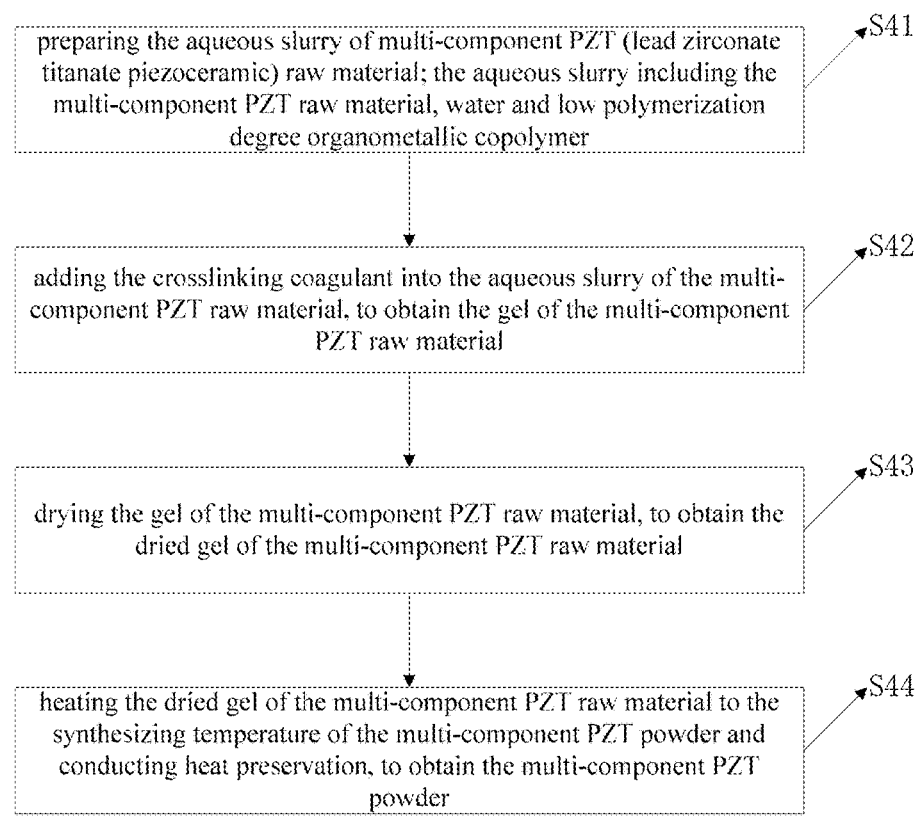
FIG. 4 is a flowchart of the method for synthesizing multi-component piezoceramic PZT powder according to the fourth embodiment of the present invention.

FIG. 4 shows a flowchart of the method for synthesizing multi-component PZT piezoceramic according to the fourth embodiment of the present invention.

As shown in FIG. 4, the synthesizing method includes:

S41, preparing the aqueous slurry of multi-component PZT (lead zirconate titanate piezoceramic) raw material; the aqueous slurry including the multi-component PZT raw material, water and low polymerization degree organometallic copolymer, the low polymerization degree organometallic copolymer is the one with a molecule weight of $10^4$ to $10^5$, preferably isobutene-maleic anhydride organometallic copolymer amide-ammonium salt with a molecule weight of $10^4$ to $10^5$.

The multi-component PZT raw material includes non-water soluble powder of $Pb_3O_4$, $ZrO_2$, $TiO_2$, $La_2O_3$, $Nb_2O_5$, $MnCO_3$, in which the molar ratio of each element in PZT is Pb:Zr:Ti=1:0.53:0.47, and then 0.01 mol of La, 0.012 mol of Nb and 0.002 mol of Mn are added, the deionized water with a weight being 20%~100% of the weight of the multi-component PZT raw material and the isobutene-maleic anhydride organometallic copolymer amide-ammonium salt with a weight being 0.3%~0.8% thereof are added, and are mixed-grinded in a ball mill for 1 hour or 30 hours with the ball material ratio (the mass ratio of the grinding body and the multi-component PZT raw material, water and low polymerization degree organometallic copolymer) of 1~5:1 to prepare the aqueous slurry of the multi-component PZT raw material. Preferably, the weight of the deionized water is 20%, 26%, 28%, 30%, 31%, 35%, 40%, 45%, 50%, 55%, 60%, 65%, 70%, 75%, 80%, 85%, 90%, 95% or 100% of the weight of the piezoceramic PZT raw material powder, most preferably, 25%; preferably, the weight of the isobutene-maleic anhydride organometallic copolymer amide-ammonium salt is 0.3%, 0.4%, 0.5%, 0.6%, 0.7% or 0.8% of the weight of the multi-component PZT raw material, most preferably, 0.5%, and the mixed-grinding time is preferably 16 hours. Preferably, the ball material ratio is 2:1.

S42, adding the crosslinking coagulant into the aqueous slurry of the multi-component PZT raw material, to obtain the gel of the multi-component PZT raw material.

Specifically, after the aqueous slurry prepared in the step S41 is discharged from the ball mill, the polyethyleneimine water solution with a concentration of 5° % to 20% is added while stirring the aqueous slurry prepared in the step S41, the weight of the polyethyleneimine water solution is 2% to 10% of the weight of the isobutene-maleic anhydride organometallic copolymer amide-ammonium salt, and then the mixture still stands for about 3 min to 10 min after stirring evenly, such that the aqueous slurry of the multi-component piezoceramic PZT raw material added with the crosslinking coagulant is gelated to obtain the gel of the multi-component piezoceramic PZT raw material. The concentration of the polyethyleneimine water solution is preferably 5%, 6%, 7%, 8%, 9%, 10%, 11%, 12%, 13%, 14%, 15%, 16%, 17%, 18%, 19% or 20%, most preferably, 15%. The added amount of the polyethyleneimine water solution is preferably 2%, 3%, 4%, 5%, 6%, 7%, 8%, 9% or 10%, most preferably, 5%. The still-standing time is preferably 6 min.

S43, drying the gel of the multi-component PZT raw material, to obtain the dried gel of the multi-component PZT raw material.

Specifically, the gel of the multi-component PZT raw material is cut into a small block with a volume of 1 $cm^3$, placed into the crucible, and then is dehydrated and dried in a drier at a temperature of 100° C. to a constant weight.

S44, heating the dried gel of the multi-component PZT raw material to the synthesizing temperature of the multi-component PZT powder and conducting heat preservation, to obtain the multi-component PZT powder.

Specifically, the dried gel of the multi-component piezoceramic PZT raw material is placed in a crucible, and when the temperature is raised to 850° C. in a muffle furnace, the heat preservation is conducted for 2 hours, that is to obtain the multi-component PZT powder with a single phase structure. The upper, middle and lower position samples of the multi-component PZT powder are selected to conduct the XRD structural analysis and chemical component analysis, with the result that the physical phase structure and the chemical component of each position are identical. Consistent with the result obtained by the acrylamide system gel solid-phase synthesizing method in the past, the multi-component PZT powder with less impurity phases can be prepared without heating for a long time at a temperature of 600° C. to remove the organic binder. Its process is simpler and its synthesizing cost is reduced.

Fifth Embodiment

Figure 5:
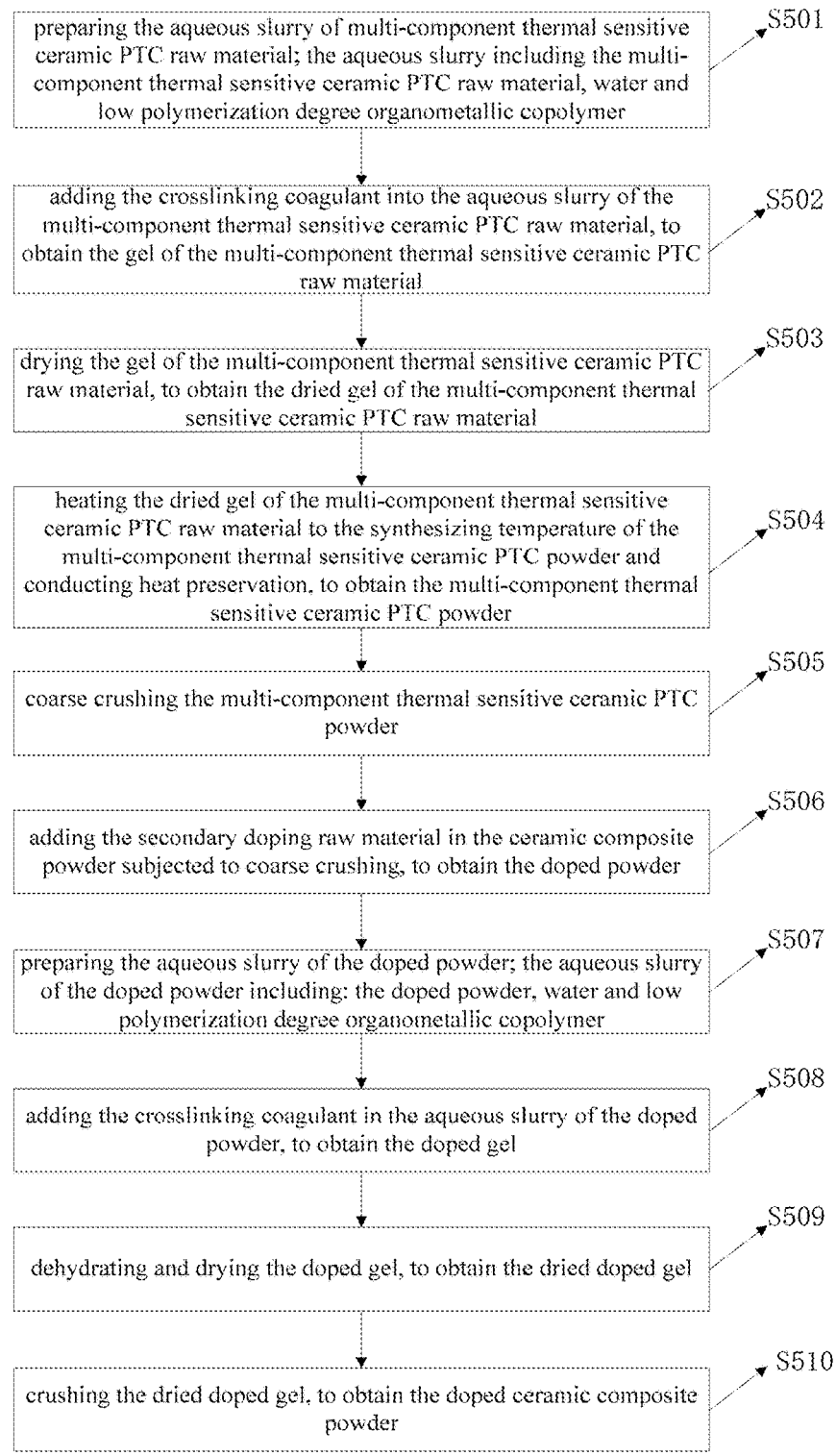
FIG. 5 is a flowchart of the method for synthesizing multi-component thermal sensitive ceramic PTC powder according to the fifth embodiment of the present invention.

FIG. 5 shows a flowchart of the method for synthesizing multi-component thermal sensitive ceramic PTC powder according to the fifth embodiment of the present invention.

As shown in FIG. 5, the synthesizing method includes:

S501, preparing the aqueous slurry of multi-component thermal sensitive ceramic PTC raw material; the aqueous slurry including the multi-component thermal sensitive ceramic PTC raw material, water and low polymerization degree organometallic copolymer, the low polymerization degree organometallic copolymer is the one with a molecule weight of $10^4$ to $10^5$, preferably isobutene-maleic anhydride organometallic copolymer amide-ammonium salt with a molecule weight of $10^4$ to $10^5$.

The multi-component thermal sensitive ceramic PTC raw material includes non-water soluble powder of $BaCO_3$, $Pb_3O_4$, $CaCO_3$, $TiO_2$ and water-soluble $YCl_3$, in the multi-component thermal sensitive ceramic PTC powder, Ba:Pb:Ca:Ti:Y=0.93:0.03:0.04:1.01:0.011 (molar ratio), and then the deionized water with a weight being 20%~100% of the weight of the multi-component thermal sensitive ceramic PTC raw material and the isobutene-maleic anhydride organometallic copolymer amide-ammonium salt with a weight being 0.3%~0.8% thereof are added, and are mixed-grinded in a ball mill for 1 hour or 30 hours with the ball material ratio (the mass ratio of the grinding body and the multi-component thermal sensitive ceramic PTC raw material, water and low polymerization degree organometallic copolymer) of 1~5:1 to prepare the aqueous slurry of the multi-component thermal sensitive ceramic PTC raw material. Preferably, the weight of the deionized water is 20%, 25%, 28%, 31%, 34%, 40%, 45%, 50%, 55%, 60%, 65%, 70%, 75%, 80%, 85%, 90%, 95% or 100% of the weight of the multi-component thermal sensitive ceramic PTC raw material, most preferably, 35%; preferably, the weight of the isobutene-maleic anhydride organometallic copolymer amide-ammonium salt is 0.3%, 0.4%, 0.5%, 0.6%, 0.7% or 0.8% of the weight of the multi-component thermal sensitive ceramic PTC raw material, most preferably, 0.6%, and the mixed-grinding time is preferably 20 hours. Preferably, the ball material ratio is 2:1.

S502, adding the crosslinking coagulant into the aqueous slurry of the multi-component thermal sensitive ceramic PTC raw material, to obtain the gel of the multi-component thermal sensitive ceramic PTC raw material.

Specifically, after the aqueous slurry prepared in the step S51 is discharged from the ball mill, the polyethyleneimine water solution with a concentration of 5% to 20% is added while stirring the aqueous slurry prepared in the step S51, the weight of the polyethyleneimine water solution is 2% to 10% of the weight of the isobutene-maleic anhydride organometallic copolymer amide-ammonium salt, and then the mixture still stands for about 3 min to 10 min after stirring evenly, such that the aqueous slurry of the multi-component thermal sensitive ceramic PTC raw material added with the crosslinking coagulant is gelated to obtain the gel of the multi-component thermal sensitive ceramic PTC raw material. The concentration of the polyethyleneimine water solution is preferably 10%. The added amount of the polyethyleneimine water solution is preferably 10% of the weight of the isobutene-maleic anhydride organometallic copolymer amide-ammonium salt. The still-standing time is preferably 10 min.

S503, drying the gel of the multi-component thermal sensitive ceramic PTC raw material, to obtain the dried gel of the multi-component thermal sensitive ceramic PTC raw material.

Specifically, the gel of the multi-component thermal sensitive ceramic PTC raw material is cut into a small block with a volume of 1 cm$^3$, placed into the crucible, and then is dehydrated and dried in a microwave oven to a constant weight.

Specifically, the gel of the multi-component thermal sensitive ceramic PTC raw material is cut into a small block with a volume of 1 cm$^3$, and then is dehydrated and dried naturally or in a microwave oven to a constant weight.

S504, heating the dried gel of the multi-component thermal sensitive ceramic PTC raw material to the synthesizing temperature of the multi-component thermal sensitive ceramic PTC powder and conducting heat preservation, to obtain the multi-component thermal sensitive ceramic PTC powder.

Specifically, the crucible is covered to be placed in the muffle furnace to directly raise the temperature to 1180° C. and then conduct heat preservation for 2 hours, to obtain the multi-component thermal sensitive ceramic PTC powder.

S505: coarse crushing the multi-component thermal sensitive ceramic PTC powder.

Specifically, a sieve of 0.5 mm is adopted to conduct the coarse crushing.

S506, adding the secondary doping raw material in the ceramic composite powder subjected to coarse crushing, to obtain the doped powder, the secondary doping raw material including: $Sb_2O_3$, $MnCO_3$, $SiO_2$, $Al_2O_3$ and $Li_2CO_3$ powder; and mixing with the multi-component thermal sensitive ceramic PTC powder according to the prescribed use amount.

S507, preparing the aqueous slurry of the doped powder; the aqueous slurry of the doped powder including: the doped powder, water and low polymerization degree organometallic copolymer; the low polymerization degree organometallic copolymer is the one with a molecule weight of $10^4$ to $10^5$, preferably isobutene-maleic anhydride organometallic copolymer amide-ammonium salt with a molecule weight of $10^4$ to $10^5$.

Specifically, the deionized water with a weight being 35% of the total weight of the raw material (PTC powder and secondary doping raw material) and the isobutene-maleic anhydride organometallic copolymer amide-ammonium salt with a weight being 0.6% thereof are added, and are mixed-grinded in the ball mill with the ball material ratio (the mass ratio of the grinding body, the multi-component thermal sensitive ceramic PTC powder and the secondary doping raw material) of 2:1 for 4 hours to prepare the aqueous slurry.

S508, adding the crosslinking coagulant in the aqueous slurry of the doped powder, to obtain the doped gel.

Specifically, after the aqueous slurry of the doped powder is discharged from the ball mill, the polyethyleneimine water solution with a concentration of 10% is added while stirring the aqueous slurry. The added amount is 10% of the weight of the isobutene-maleic anhydride organometallic copolymer amide-ammonium salt, and then the mixture still stands for about 10 min after stirring evenly, to gelate the aqueous slurry of the doped powder.

S509, dehydrating and drying the doped gel, to obtain the dried doped gel.

The dried doped gel is taken out from the container to cut into small blocks with a volume of 1 cm$^3$, and then placed in the crucible, and is dehydrated and dried to a constant weight in a microwave oven, to obtain the dried doped gel.

S510, crushing the dried doped gel, to obtain the doped ceramic composite powder.

The multi-component doped thermal sensitive ceramic PTC powder having undergone doping and with uniform components can be obtained after crushing. With the result consistent with that obtained by the acrylamide system gel solid-phase synthesizing method, its process is simpler, even eliminating the process of burning off the organic substance at a temperature of 600° C., and the cost is reduced obviously.

FIG. 6 is a XRD spectrogram of the two-component spinel zinc ferrite powder synthesized by the synthesizing method according to the first embodiment of the present invention.

FIG. 7 is a XRD spectrogram of the three-component spinel zinc manganese ferrite powder synthesized at a temperature of 1050° C. according to the second embodiment of the present invention.

Figure 8:
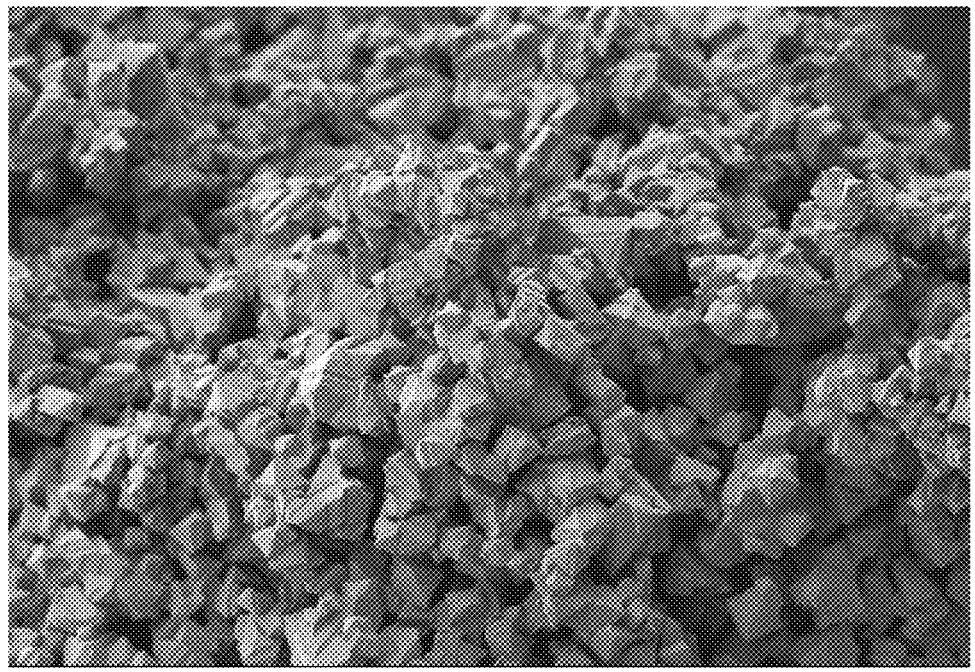
FIG. 8 is an SEM microcosmic topography of the three-component spinel zinc manganese ferrite powder synthesized at a temperature of 1050° C. according to the second embodiment of the present invention.

FIG. 8 is an SEM microcosmic topography of the three-component spinel zinc manganese ferrite powder synthesized at a temperature of 1050° C. according to the second embodiment of the present invention.

Figure 9:
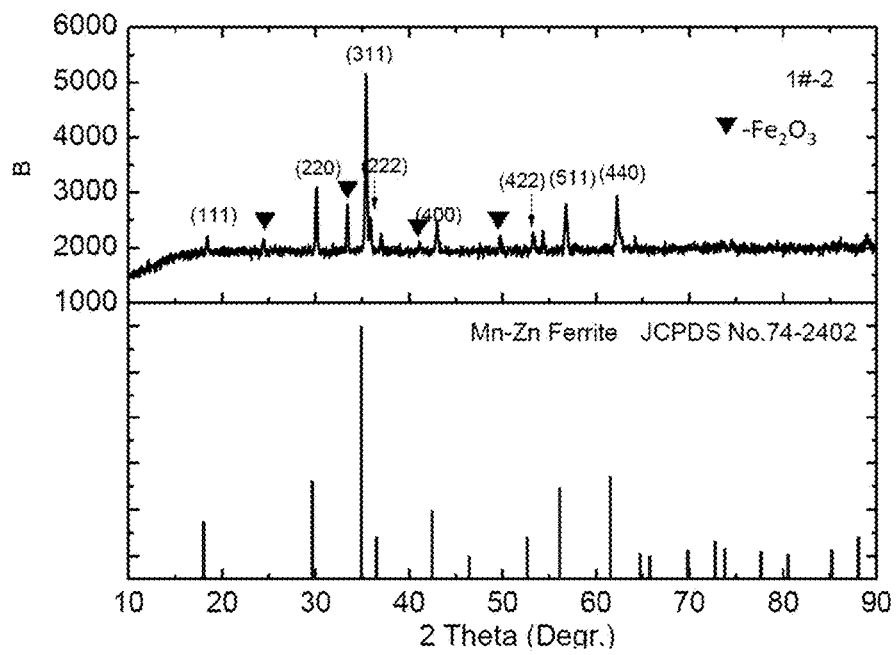
FIG. 9 is an XRD spectrogram of the three-component spinel zinc manganese ferrite powder synthesized at a temperature of 1050° C. by the traditional solid-phase reaction method.

FIG. 9 is a XRD spectrogram of the three-component spinel zinc manganese ferrite powder synthesized at a temperature of 1050° C. by the traditional solid-phase reaction method.

Figure 10:
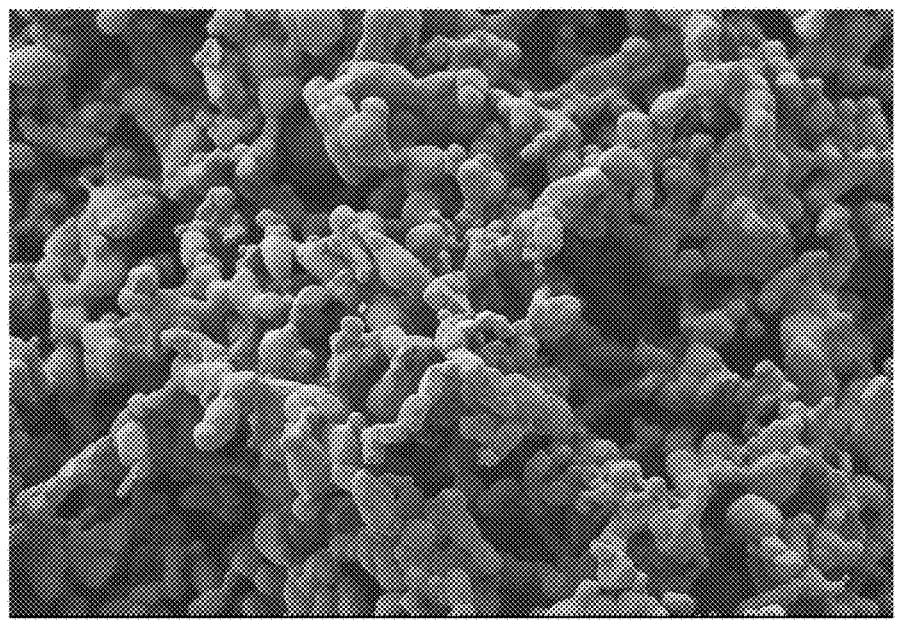
FIG. 10 is an SEM microcosmic topography of the three-component spinel zinc manganese ferrite powder synthesized at a temperature of 1050° C. by the traditional solid-phase reaction method.

FIG. 10 is an SEM microcosmic topography of the three-component spinel zinc manganese ferrite powder synthesized at a temperature of 1050° C. by the traditional solid-phase reaction method.

FIG. 11 is a XRD spectrogram of the three-component spinel nickel zinc ferrite powder synthesized by the embodiment of the present invention.

With the comparison of FIG. 7 with FIG. 9 and the comparison of FIG. 8 with FIG. 10, it can be seen that in the traditional solid-phase reaction method, the same raw material is mixed-grinded by the same wet method to be dehydrated and dried, and the heat preservation is conducted at the temperature of 1050° C. for 3 hours, with much impurity phases and poor crystal growth. Moreover, it needs to further heat to the temperature of 1150° C., and then the impurity phase can be eliminated. However, at this time, the grain size is increased. As such, the method of the emobidment of the present invention can reduce the synthesizing temperature by about 100° C. compared with the traditional solid-phase reaction method, and has good effects.

The present invention further relates to ceramic composite powder synthesized by any one of the synthesizing methods.

The present invention is directed to protecting a method for synthesizing multi-component ceramic composite powder, in which the isobutylene-maleic anhydride copolymer organic amide-ammonium salt is adopted as the dispersing agent, which can prepare the aqueous slurry with high solid-phase content, good mobility, and stable suspension. After discharging, the polyethyleneimine water solution is added as the crosslinking coagulant, the mixture still stands after being stirred evenly, and can rapidly gelate within a short time to form a gel, thereby maintaining the homogeneity of the raw material component of each component. The weight of the polyethyleneimine water solution is less than 1% of the multi-component ceramic raw material, and is non-toxic and harmless. The synthesized multi-component ceramic composite powder has less impurity phase and good crystal growth, and does not need to further heat to remove the impurity phase. In addition, the synthesizing temperature is reduced compared with the traditional synthesizing method. Moreover, the prepared ceramic powder is easy to break, has high quality, convenient ceramic raw material source, low production cost, high efficiency, accurate control of the each component, and little pollution to environment and is suitable for industry production. It shall be understood that the above embodiments of the present invention are only used for illustratively explaining the principle of the present invention, without limiting the present invention. Therefore, all the medications, equivalent substitutions and improvements made without departing from the spirit and scope of the present invention shall fall within the protection scope of the present invention. In addition, the claims of the present invention are directed to covering all variations and modifications falling within the scope and boundary of the claims, or the equivalent scope and boundary.

What is claimed is:

1. A method for synthesizing ceramic composite powder, comprising:
    preparing an aqueous slurry of ceramic raw materials, the aqueous slurry comprising ceramic raw material, water and low polymerization degree organometallic copolymer, the ceramic raw material comprising at least two components; the low polymerization degree organometallic copolymer is isobutene-maleic anhydride organometallic copolymer amide-ammonium salt with a molecular weight of $10^4 \sim 10^5$;
    adding a crosslinking coagulant into the aqueous slurry to obtain a gel,
    dehydrating and drying the gel to obtain the dried gel;
    heating the dried gel to the synthesizing temperature of the ceramic composite powder and conducting heat preservation to obtain ceramic composite powder or ceramic composite base powder;
    conducting secondary doping on ceramic composite base powder to obtain the ceramic composite powder.

2. The synthesizing method according to claim 1, wherein the ceramic raw material comprises carbonate, oxalate, acetate, hydroxide, oxide and/or minor additive elements, the minor additive elements comprising water-soluble saline material.

3. The synthesizing method according to claim 1, wherein a weight ratio of the ceramic raw material, water and low polymerization degree organometallic copolymer is 100: 20~100:0.3~0.8.

4. The synthesizing method according to claim 1, wherein the crosslinking coagulant is a polyethyleneimine water solution with a concentration of 5%~20%, and the added amount is 2%~10% of the weight of the low polymerization degree organometallic copolymer.

5. The synthesizing method according to claim 1, wherein the step of conducting the secondary doping on the ceramic composite base powder to obtain the ceramic composite powder comprises:
    coarse crushing the ceramic composite base powder;
    adding the secondary doping raw material in the ceramic composite base powder subjected to coarse crushing, to obtain the doped powder, the secondary doping raw material comprising: $Sb_2O_3$, $MnCO_3$, $SiO_2$, $Al_2O_3$ and $Li_2CO_3$ powder;
    preparing an aqueous slurry of the doped powder, comprising: doped powder, water and low polymerization degree organometallic copolymer;
    adding the crosslinking coagulant in the aqueous slurry of the doped powder, to obtain the doped gel;
    dehydrating and drying the doped gel to obtain the dried doped gel;
    crushing the dried doped gel to obtain the ceramic composite powder.

6. The synthesizing method according to claim 1, wherein the step of adding the crosslinking coagulant in the aqueous slurry comprises:
    stirring the aqueous slurry to be substantially uniform while adding the crosslinking coagulant;
    standing the mixture for 3 min to 10 min to obtain the gel.

7. The synthesizing method according to claim 1, wherein the step of preparing the aqueous slurry of the ceramic raw material comprises:
    mixed-grinding the ceramic raw material, water and low polymerization degree organometallic copolymer for 1 hour to 30 hours, to obtain the aqueous slurry of the ceramic raw material.

8. The synthesizing method according to claim 6, wherein the dehydration and drying process conducted on the gel comprises natural dehydration and drying, heating dehydration and drying, infrared heating or microwave heating and drying;
    the heating the dried gel comprises calcining and heating.

* * * * *